Patented May 31, 1932

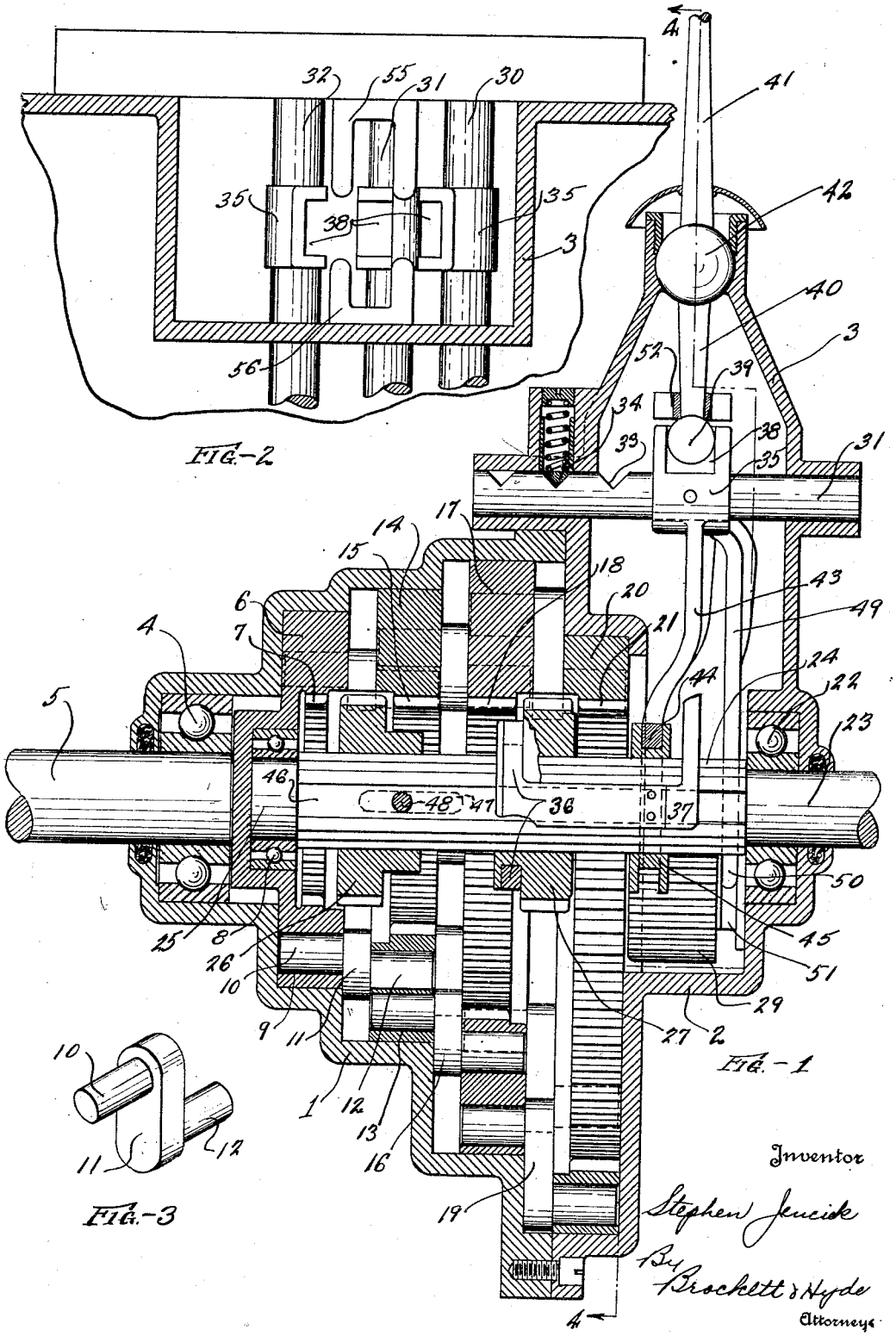

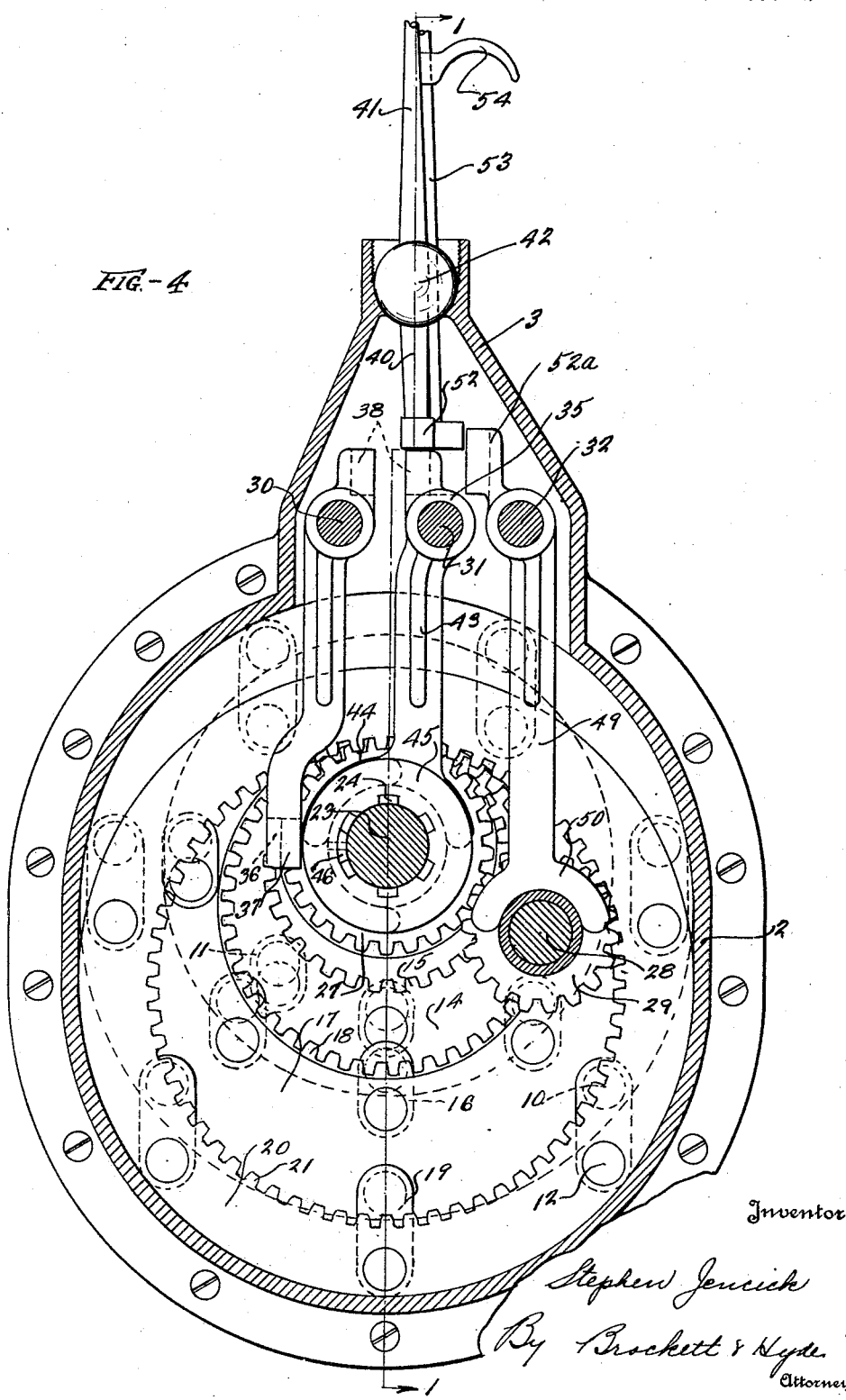

1,860,674

UNITED STATES PATENT OFFICE

STEPHEN JENCICK, OF CHAGRIN FALLS, OHIO

TRANSMISSION

Application filed June 6, 1927. Serial No. 196,858.

This invention relates to gearing and particularly to transmission gearing used in motor vehicles.

The popular type of transmission gearing at the present time is that known as the selective spur gear type. It includes a plurality of spur gears in peripheral external mesh, except for direct drive, and so arranged that the different speeds are transmitted from the prime mover, or motor, to the propeller shaft or other driven member. It is a well known fact that while noise and vibration in transmissions of this type have been reduced to a minimum, these factors are still present and are undesirable. It is also a fact that, at the present day, when it is desired to obtain more than three speeds forward the additional speed is obtained by an extra gear thrown into the train in any suitable manner, but requiring that the drive through the transmission should go through this gear, through the propeller shaft and not through direct drive. All of these arrangements are noisy and undesirable for that reason. Such a transmission is used at the present day upon trucks and busses.

It is well known that internal gearing is very much more quiet than external gearing but this type of gearing does not readily lend itself to transmission gear work by reason of the difficulty in collecting the controls or shifts in any one single piece of mechanism. In other words, heretofore it has been impossible to arrange internal gearing in a manner such that the pinions shifted by the control slide nicely from one gear to another.

The object of the present invention, therefore, is to provide a transmission gearing of the internal gear type arranged in a manner such that the movable gears are slidable laterally into mesh with the other gears, selectively and permit the use of substantially the same type of selective gear shift well known and used by almost all makes of automobiles. This type gear shift, of course, is known is the H-type of transmission.

The invention already outlined and other additional features of invention will be more clearly brought out in the following description, drawings and claims.

Referring to the drawings, Fig. 1 is a vertical section of the transmission; Fig. 2 is a detailed plan view looking down upon the control; Fig. 3 is a detailed view of one of the driving cranks; and Fig. 4 is a distorted section following substantially the inner face of the front of the transmission and looking rearwardly.

In the embodiment shown, 1 represents the rear housing member and 2 the front housing member, said members being arranged to house the entire mechanism and the front housing member being provided with the usual upstanding control housing portion 3. The details of this housing will be given in connection with the various specific features as they are described. Mounted in suitable bearings 4 in the rear housing member 1 is the driven shaft 5. In automobile practice this shaft 5, of course, would be the propeller shaft to the wheels. Within the housing member 1 and rigidly secured to the shaft 5 is the direct drive gear 6 having internal teeth 7. This gear also carries a pilot bearing 8 for the inner end of the driving shaft, as will appear. This gear is of sufficient dimension to provide a rim body of suitable size to provide bearing openings 9 for driving links or cranks, each comprising a crank pin 10, a crank 11 and an opposed crank pin 12, as shown in Fig. 3. There are a suitable number of these cranks symmetrically disposed about the rim of the direct drive gear and their crank pins 12 engage in suitable bearing openings 13 in what may be termed the third speed gear 14 which is mounted in suitable peripheral bearings in the housing member 1. This gear 14 is provided with internal teeth 15 and the mounting of this gear in its bearings is eccentric to the direct drive gear 6 so that the teeth 15 of this third speed gear at the top are in lateral alignment with the teeth 7 of the direct drive gear.

In like manner this third speed gear 14 is connected by crank type links 16 with a second speed gear 17 having internal gear teeth 18 and mounted in suitable bearings in the rear housing member. As in the case of the third speed gear, this second speed gear 17 is supported eccentrically with respect to the direct drive gear 6 and to such an extent that its teeth 18 are also in lateral alignment with the teeth 15 and 7 of the other two gears. This gear 17 is also connected by cranks 19, similar in all respects to other cranks, to a first speed gear 20 having internal gear teeth 21 and mounted in bearings in the front gear housing member 2 in the same eccentric way so that its teeth 21, at the top, are in alignment with the teeth 18, 15 and 7, as shown in Fig. 1.

Rotatably mounted in suitable bearings 22 in the front housing member 2 is the driving shaft 23 provided with a suitably splined portion 24 extending within the complete housing and at its inner end provided with a pilot 25 engaging the pilot bearing 8. This splined portion 24 carries a direct and third speed pinion or gear 26 slidably arranged in driving connection with the splined portion 24 of the propeller shaft as in normal practice. Obviously this pinion or gear 26 may be shifted either into mesh with the gear teeth 7 of the direct drive gear 6 and produce direct drive through the transmission or it may be moved to the right, as viewed in Fig. 1, and brought into engagement with the upper teeth 15 of the third speed gear 14 and produce third speed driving relation between the driving shaft 23 and the propeller or driven shaft 5. The splined portion of the driving shaft 23 is also provided with a pinion or gear 27 in driving splined relation with the splined portion 24 of the shaft 23 and is of such a size that its teeth may mesh with the upper teeth 18 or 21 of the internal gears 17 and 20, and produce either second or first speed driving relation. Mounted upon a suitable jack shaft 28, supported in the housing, is a back reverse gear 29 of such length, and supported in such a position, that it may be slid transversely into mesh with the first speed gear teeth 21 and also the first and second speed gear or pinion 27 and thereby produce reverse direction of rotation of the propeller or driven shaft.

The control for shifting the various movable pinions or gears is very similar to that used in connection with the normal transmission and the various operations shift the three gears 26, 27 and 29 and produce reverse, low speed or second speed, third speed and direct drive which becomes fourth speed.

This control mechanism is arranged in the housing portion 3 and it comprises three slide rods, 30 for the first and second speed; 31 for the third and the fourth, direct drive speeds; and 32 for the reverse. Each of these slide rods is provided with the usual group of three notches 33 adapted to be engaged by a spring actuated centering pin 34 to hold the rod in any one of its three positions. Rigidly secured to the slide rod 30 is a shifter member comprising a boss 35 secured to the rod and a gear fork 36 carried by the lower end of the arm 37. The upper end of this shifting device is bifurcated at 38 to receive a shifter disk 39 on the lower short arm 40 of the hand shifting lever 41 which is provided with the usual supporting and bearing ball 42 arranged in the upper end of the control housing portion.

The next shaft 31 is provided with a similar gear shifting member comprising the arm 43 carrying a fork 44 engaging in a shifting collar 45 connected to an inner slide 46 arranged within a suitable longitudinal opening provided in the splined portion 24 of the shaft 23 as is used in many gear shifts. A suitable slot 47 is provided in the shaft for the passage of a pin 48 engaging the pinion 26. This shifting arm 43 is also provided with an upper end similar to that shown in connection with the one on the shaft 30.

The reverse drive guide rod 32 is provided with a similar gear shifting arm 49 provided with a lower forked end 50 engaging in a groove 51 in the reverse gear 29. The upper end of this arm is provided with a gear lever engaging recessed end 52$^a$ having a lateral recess in its side for engagement by the disk 39 on the lower end of the gear shift lever. This portion 52$^a$ of this gear shift lever is taller than the other similar portions of the other levers and is adapted to be engaged by a latch 52 slidable on the lower arm 40 of the gear shift lever and adapted to be moved upward by a rod 53 and a finger piece 54. The recesses 38, in the first and second speed shifting arm and in the reverse arm, both open toward each other while, in the case of the middle or third and direct drive arm, the opening 38 extends transversely through so that the disk of the gear shift lever may pass to reverse when the latch 52 is raised.

To guide the arm 43, for the third and fourth speeds, the control housing portion is provided with opposed guides 55 and 56 engaging the arm when shifted in either direction from neutral.

The operation of the device will be well understood from the foregoing by those familiar with the usual automobile transmission.

What I claim is:

1. A transmission gearing, comprising a housing, a driving shaft and a driven shaft entering said housing in axial alignment, a plurality of internal gears eccentric to the axis of said driving and driven shafts with the gear teeth of all of said internal gears, at the same point in the periphery, in transverse alignment, suitable intermediate gears between said internal gears and the driving shaft, and suitable driving connections between said internal gears and the driven shaft.

2. A transmission gearing as in claim 1 wherein said internal gears are connected together in driving relation by a self-adjusting connection.

3. A transmission gearing as in claim 1 wherein said internal gears are connected by a plurality of crank members having crank pins engaging bearings in adjacent gears.

4. A transmission gearing, comprising a housing, a driving shaft and a driven shaft entering said housing in axial alignment, direct drive connections between said shafts comprising a fixed and a movable clutch member, a plurality of eccentrically arranged internal gears surrounding the axis of said shafts and supported for rotation in said housing, the eccentric arrangement of said internal gears bringing their teeth at any one point in lateral alignment parallel to the axis of the shafts, and a sliding gear mounted upon one of said shafts and adapted to be slid thereon into mesh with some of said internal gears.

5. Power transmission means for the purpose described and comprising a rotatable driving shaft, a rotatable driven shaft mounted in alignment with said driving shaft, a driving pinion slidable and non-rotatable on said driving shaft, and a plurality of internal gears of different diameters eccentric to said pinion and arranged to be selectively engaged for actuation by said pinion and each associated with said driven shaft for driving the same.

6. Power transmission means for the purpose described and comprising a rotatable driving shaft, a rotatable driven shaft mounted in alignment with said driving shaft, a driving pinion slidable and non-rotatable on said driving shaft, and a plurality of internal gears of different pitch diameters eccentric to said pinion and having their pitch circles tangent to that of said pinion whereby said gears may be selectively engaged for actuation by said pinion, each of said gears being associated with said driven shaft for driving the same.

7. Power transmission means for the purpose described and comprising a rotatable driving shaft, a rotatable driven shaft mounted in alignment with said driving shaft, a driving pinion slidable and non-rotatable on said driving shaft, and a plurality of internal gears of differing pitch diameters eccentric to said pinion and having their pitch circles tangent to that of said pinion whereby said gears may be selectively engaged for actuation by said pinion, each of said gears being mounted for rotation about its own axis, one of said gears being associated with said driven shaft for driving the same, and means associating another of said gears with said one gear for effecting actuation of said driven shaft therethrough.

8. Power transmission means for the purpose described and comprising a rotatable driving shaft, a rotatable driven shaft mounted in alignment with said driving shaft, a driving pinion slidable and non-rotatable on said driving shaft, and a plurality of internal gears of differing diameters eccentric to said pinion and to be selectively engaged for actuation by said pinion and each associated with said driven shaft for driving the same, the said association of one of said internal gears including link means connecting said gear with another.

9. Power transmission means for the purpose described and comprising a housing, a rotatable driving shaft, a rotatable driven shaft, said shafts being arranged in alignment and supported in walls of said housing, a driving pinion slidable and non-rotatable on said driving shaft, and a plurality of internal gears of differing diameters bearing in said housing in eccentric relation to said pinion and adapted to be selectively engaged for actuation by said pinion, and each associated with said driven shaft for driving the same.

10. In a gearing, a pair of aligned shafts, a supporting casing into which the shafts project, means to connect the shafts for rotation at the same speed, and means to connect the shafts for relative rotation, comprising an annular internally toothed member, annular means supportingly embracing the member in radial alignment with the internal teeth thereof and rigid at all times with the casing to hold the annular member in fixed eccentric relation to the shafts, means for connecting the annular member to one of the shafts in direct driving relation i. e. without change of speed, a pinion for meshing with the internal teeth of the annular member, and means to establish a driving connection from the pinion to the other shaft.

11. In a gearing, a pair of axially aligned shafts, a casing therefor, a gear mounted coaxially with the shafts, means to connect the gear to one of the shafts in one to one ratio, an annular gear member in surrounding relation to one of the shafts and having internal teeth for meshing with the aforesaid gear, means for supporting the annular gear member on a fixed axis eccentric to the shafts and parallel therewith including a fixed part of the casing substantially surrounding the annular gear member, a direct one to one ratio driving connection between the annular gear member and the other shaft, whereby the mechanism will function to connect the shafts for relative speed, means to render the gears operative and inoperative to connect the shafts as aforesaid, and clutch means to connect the shafts to each other in one to one ratio for a direct driving condition of the gearing.

12. In a transmission device, the combination of a casing, a driving member, a driven member, a sleeve rotatably mounted in said casing eccentric to said driving shaft, a pin on said driving member, a pin on said sleeve, a link connecting said pins whereby said sleeve is operatively connected with the driving member, a gear on said sleeve, and a gear slidably mounted on said driven member for engagement with the gear of said sleeve whereby said driven member is driven by said sleeve.

In testimony whereof I hereby affix my signature.

STEPHEN JENCICK.